US009535642B2

(12) United States Patent
Takazawa

(10) Patent No.: US 9,535,642 B2
(45) Date of Patent: Jan. 3, 2017

(54) MANAGEMENT SYSTEM, IMAGE FORMING APPARATUS, INFORMATION PROCESSING METHOD, AND STORAGE MEDIUM

(75) Inventor: Satoshi Takazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 731 days.

(21) Appl. No.: 13/187,259

(22) Filed: Jul. 20, 2011

(65) Prior Publication Data

US 2012/0019851 A1 Jan. 26, 2012

(30) Foreign Application Priority Data

Jul. 23, 2010 (JP) ................................. 2010-166156

(51) Int. Cl.
*G06F 3/12* (2006.01)
*H04N 1/00* (2006.01)
*H04L 29/08* (2006.01)

(52) U.S. Cl.
CPC ........... *G06F 3/1285* (2013.01); *G06F 3/1205* (2013.01); *G06F 3/1232* (2013.01); *H04L 67/16* (2013.01); *H04N 1/00204* (2013.01); *H04N 1/00244* (2013.01); *H04N 1/00344* (2013.01); *H04N 1/00222* (2013.01); *H04N 2201/001* (2013.01); *H04N 2201/0039* (2013.01); *H04N 2201/0075* (2013.01); *H04N 2201/0082* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

2004/0030772 A1* 2/2004 Newell et al. ................ 709/224
2005/0105129 A1* 5/2005 Takahashi .................... 358/1.15

(Continued)

FOREIGN PATENT DOCUMENTS

JP 2007-172274 A 7/2007

*Primary Examiner* — John Wallace
(74) *Attorney, Agent, or Firm* — Canon U.S.A., Inc. IP Division

(57) ABSTRACT

A management system that can appropriately manage a list of functions that can be provided by an image forming apparatus configured to provide a function to a client apparatus by utilizing a function provided by a function provision apparatus. An image forming apparatus is configured, if the function list transmission request is received from the management apparatus, to issue an inquiry, to a function provision apparatus which provides a part of the functions provided by the image forming apparatus to the client apparatus to the image forming apparatus, about operation of the function, and if a reply to the inquiry is received from the function provision apparatus, configured to generate and transmit to the management apparatus a function list of functions provided by the image forming apparatus to the client apparatus according to information about a function, among the functions provided by the function provision apparatus included in the reply, which can be provided to the image forming apparatus and according to information about the function that can be provided by the image forming apparatus to the client apparatus. The management apparatus is configured to display the function list when the function list is received from the image forming apparatus.

7 Claims, 16 Drawing Sheets

(56) References Cited

U.S. PATENT DOCUMENTS

| | | | |
|---|---|---|---|
| 2006/0146368 A1* | 7/2006 | Uchida | 358/1.15 |
| 2006/0238793 A1* | 10/2006 | Akashi et al. | 358/1.13 |
| 2008/0028060 A1* | 1/2008 | Fukasawa et al. | 709/223 |
| 2010/0289213 A1* | 11/2010 | Yahata | B65H 31/02 |
| | | | 271/314 |

* cited by examiner

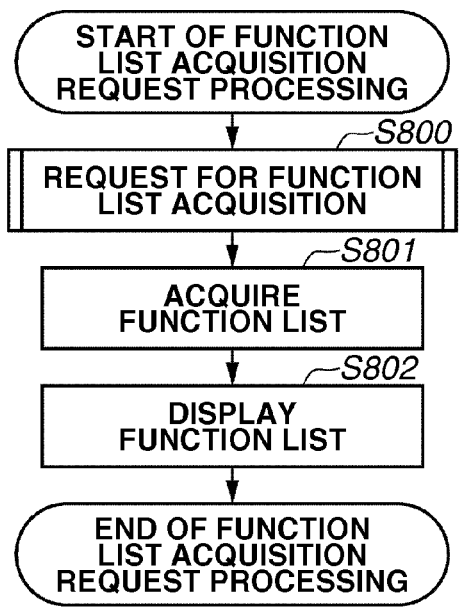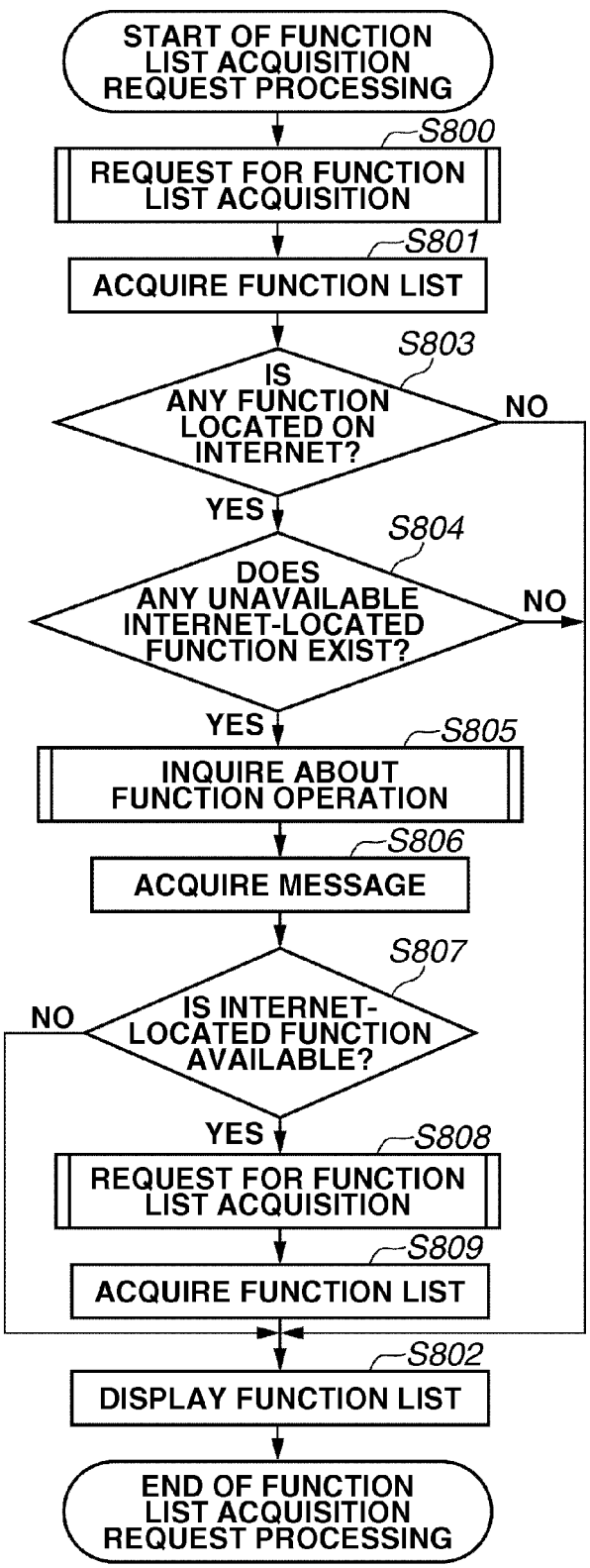

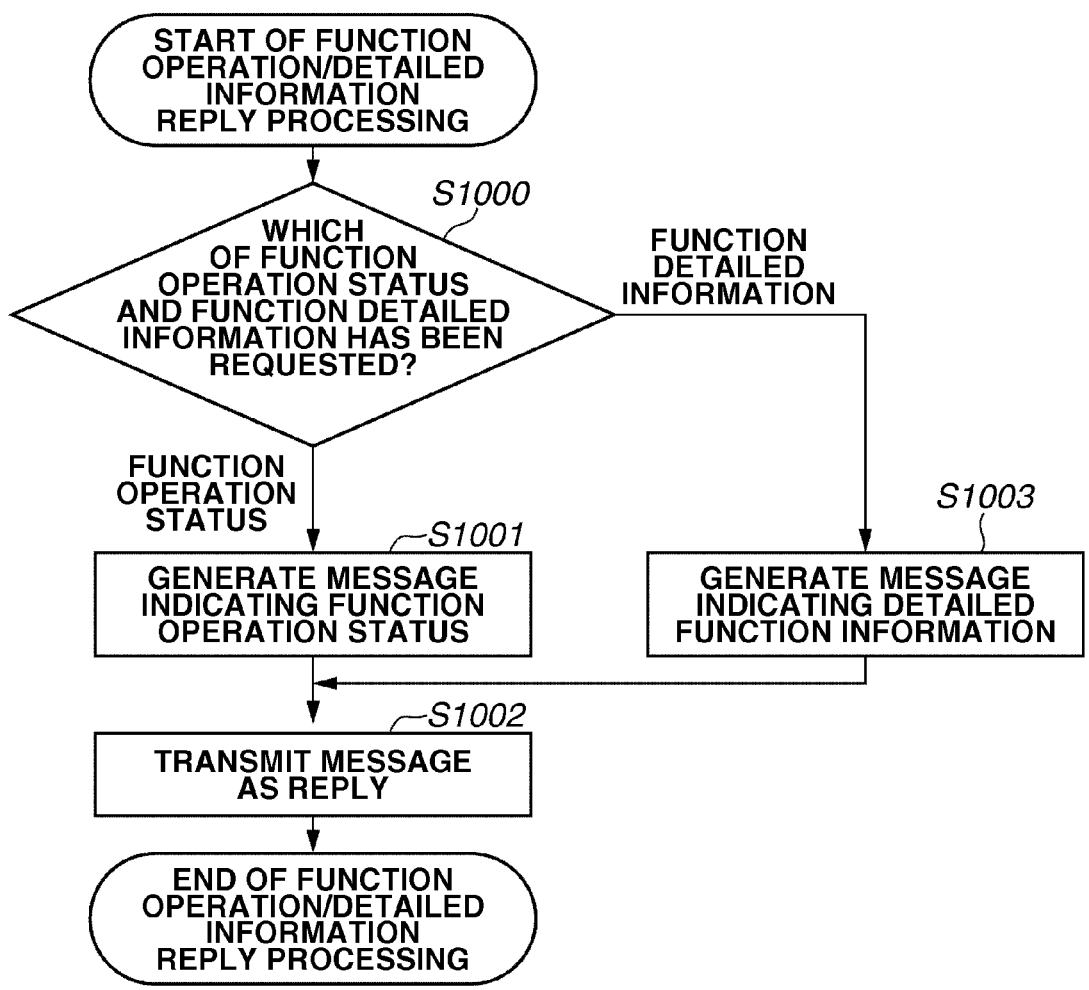

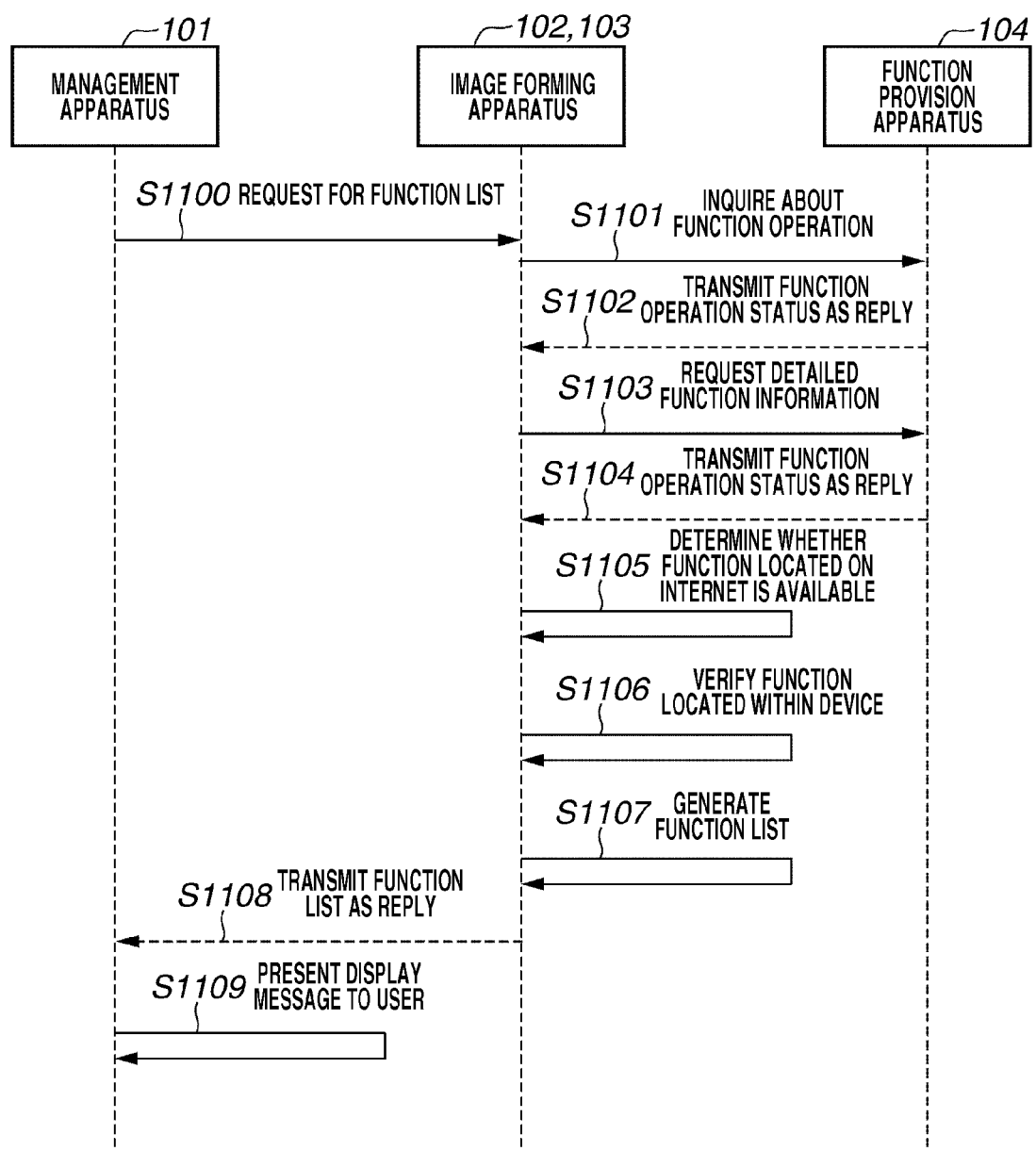

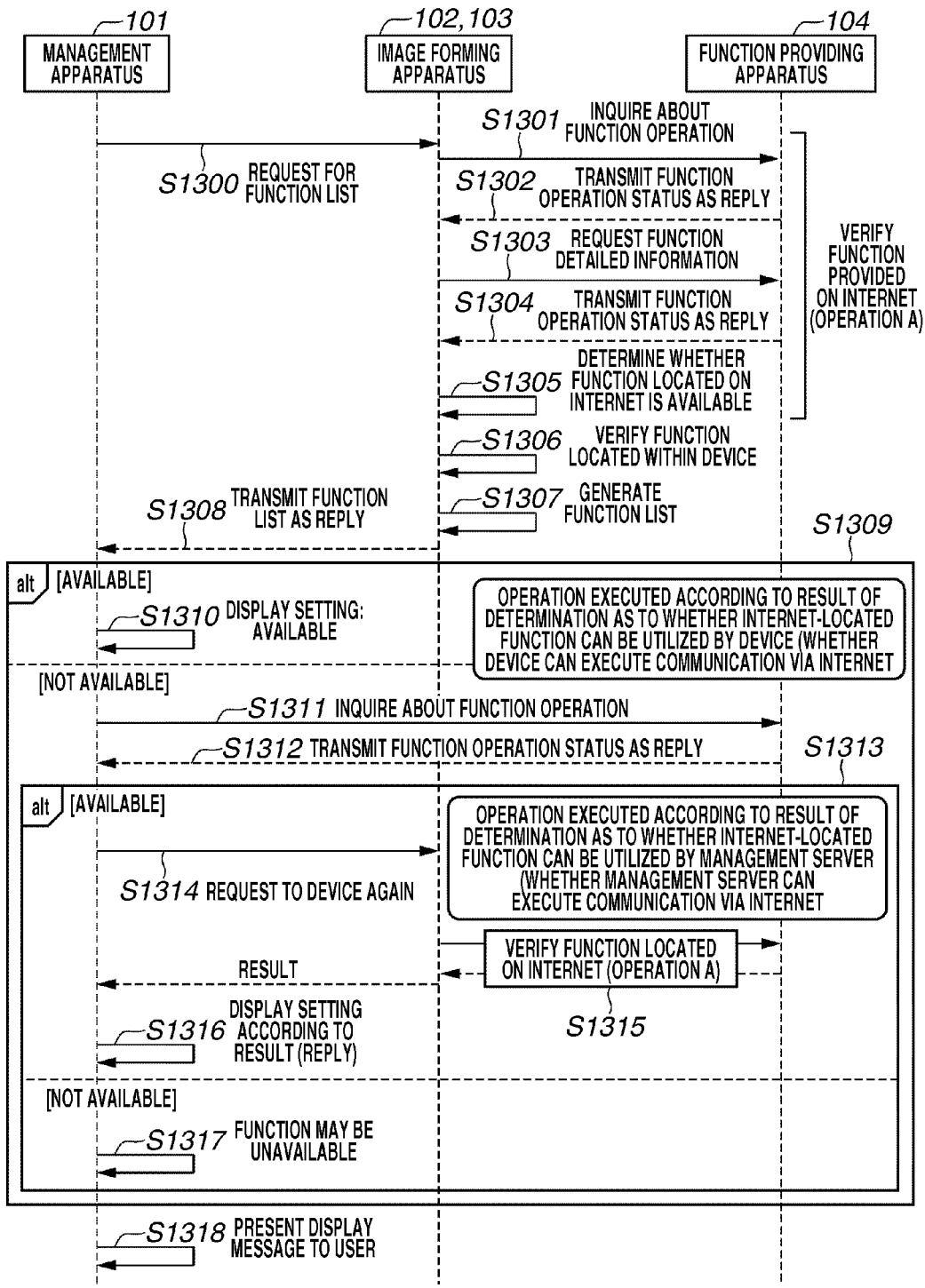

MANAGEMENT SYSTEM, IMAGE FORMING APPARATUS, INFORMATION PROCESSING METHOD, AND STORAGE MEDIUM

BACKGROUND OF THE INVENTION

1. Field of the Invention

The present invention relates to a management system, an image forming apparatus, an information processing method, and a storage medium.

2. Description of the Related Art

A multifunction peripheral (MFP) utilized in an office includes various functions. More specifically, the MFP like this may include a scan function, a FAX transmission function, and a function for converting scan data into portable document format (PDF) data. These functions are stored on a memory included in the printing apparatus (MFP) as processing programs. A processing program operates according to a user instruction and provides a function requested by the user.

In recent years, an MFP has been used that realizes these functions by using a processing program located on a network, via a communication line. For example, if a function for converting scan data into PDF data is located on a network, the following processing is to be executed. Specifically, an MFP, which is installed in an office, scans an original. Then, the scan data is transmitted to the function via a communication line. Subsequently, the function converts the received data into PDF data and temporarily stores the PDF data as a file. Then the PDF file is transmitted to the MFP installed in the office.

A conventional management apparatus and a management application (hereinafter collectively referred to as a "management apparatus") configured to manage a network-connected image forming apparatus (apparatus to be managed) have been used. Japanese Patent Application Laid-Open No. 2007-172274 discusses the following management method. In the conventional method, the management apparatus communicates with the image forming apparatus and acquire information about a function of the image forming apparatus and information about the installation status of an option device installed to the image forming apparatus, such as a paper feed device or a paper discharge device.

In the method discussed in Japanese Patent Application Laid-Open No. 2007-172274, information about a function of the option device installed to the image forming apparatus and information about a function included in the image forming apparatus can be acquired. However, in managing an image forming apparatus whose function is located on a network, the availability of a function may vary according to the state of communication between the image forming apparatus and the network-located function, unlike the conventional case of a function locally included in the image forming apparatus.

More specifically, although the function information about the image forming apparatus can be acquired by using the conventional management method, if the communication between the device (image forming apparatus) and the function is not available when the function is to be actually utilized, the desired function cannot be utilized.

SUMMARY OF THE INVENTION

The present invention is directed to a method capable of appropriately managing a list of functions that can be provided by an image forming apparatus, which provides a function to a client apparatus by utilizing a function provided by a function provision apparatus.

According to an aspect of the present invention, a management system including an image forming apparatus and a management apparatus configured to manage the image forming apparatus, wherein the management apparatus is configured to transmit, to the image forming apparatus, a function list acquisition request for acquiring a function list of functions to be provided by the image forming apparatus to a client apparatus, wherein the image forming apparatus is configured, if the function list acquisition request is received from the management apparatus, to issue an inquiry, to a function provision apparatus which provides a part of the functions provided by the image forming apparatus to the client apparatus to the image forming apparatus, about operation of the function, and if a reply to the inquiry is received from the function provision apparatus, configured to generate and transmit to the management apparatus a function list of functions to be provided by the image forming apparatus to the client apparatus according to information about a function, among the functions provided by the function provision apparatus included in the reply, which can be provided to the image forming apparatus and according to information about the function that can be provided by the image forming apparatus to the client apparatus, and wherein the management apparatus is configured to display the function list when the function list is received from the image forming apparatus.

According to an aspect of the present invention, it is enabled to appropriately manage a list of functions that can be provided by an image forming apparatus, which provides a function to a client apparatus by utilizing a function provided by a function provision apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIGS. 8A and 8B are flow charts illustrating examples of flow of processing for requesting a list of functions of a management apparatus.

FIG. 10 is a flow chart illustrating an example replying processing of a function operation status/detailed information request executed by a function provision apparatus.

FIG. 11 is a flow chart illustrating an example of the entire information processing according to a first exemplary embodiment of the present invention.

FIG. 13 is a flow chart illustrating an example of the entire information processing according to a second exemplary embodiment of the present invention.

DESCRIPTION OF THE EMBODIMENTS

Various exemplary embodiments, features, and aspects of the invention will be described in detail below with reference to the drawings.

Figure 1:
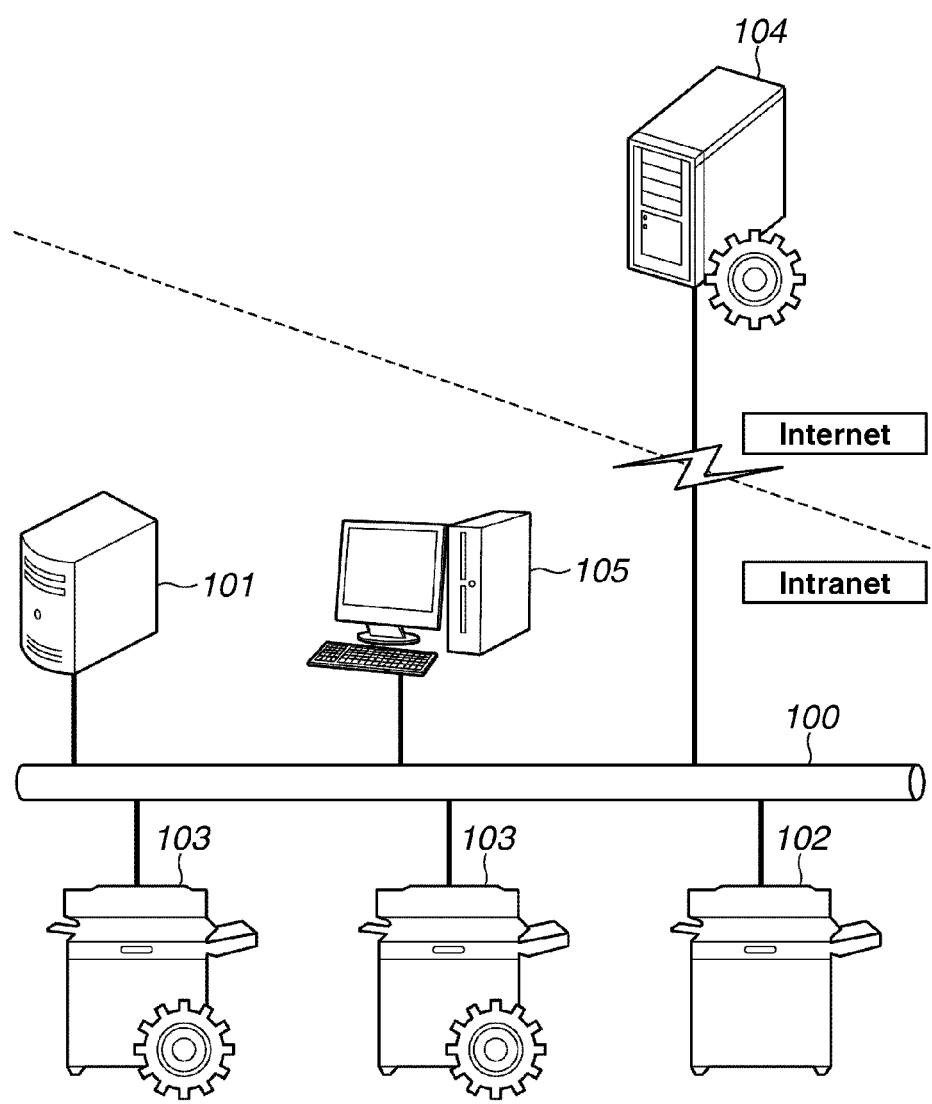
FIG. 1 illustrates an example system configuration of a management system.

FIG. 1 illustrates an example system configuration of a management system.

The management system includes a management apparatus 101, an image forming apparatuses 102 and 103, a function provision apparatus 104, and a client apparatus 105, which are connected with one another via a network 100. The management apparatus 101 is an apparatus configured to manage the image forming apparatuses 102 and 103. The function provision apparatus 104 is an apparatus in which a part of the functions of 103 is provided.

The management apparatus 101 and the function provision apparatus 104 include a configuration similar to a general personal computer (PC). The client apparatus 105 is a general PC having a browser function. The image forming apparatuses 102 and 103 are connected with the management apparatus 101 via the network 100. The image forming apparatuses 102 and 103 are apparatuses that can be managed by the management apparatus 101, such as an MFP, a printer, or a FAX apparatus.

A part of available functions of the image forming apparatus 103 is provided by the function provision apparatus 104. In utilizing the functions provided by the function provision apparatus 104 from the image forming apparatus 103, the image forming apparatus 103 communicates with the function provision apparatus 104 via the network 100. Then the function provision apparatus 104 executes necessary processing. Subsequently, the image forming apparatus 103 receives the result of the processing by the function provision apparatus 104. Furthermore, the image forming apparatus 103 presents the processing result to the user of the image forming apparatus 103.

In the example illustrated in FIG. 1, the image forming apparatus 103 is located on the Intranet. However, the present exemplary embodiment is not limited to this. More specifically, the image forming apparatus 103 can be located on the Internet. In addition, the image forming apparatus 103 provides the client apparatus 105 with a plurality of functions.

Figure 2:
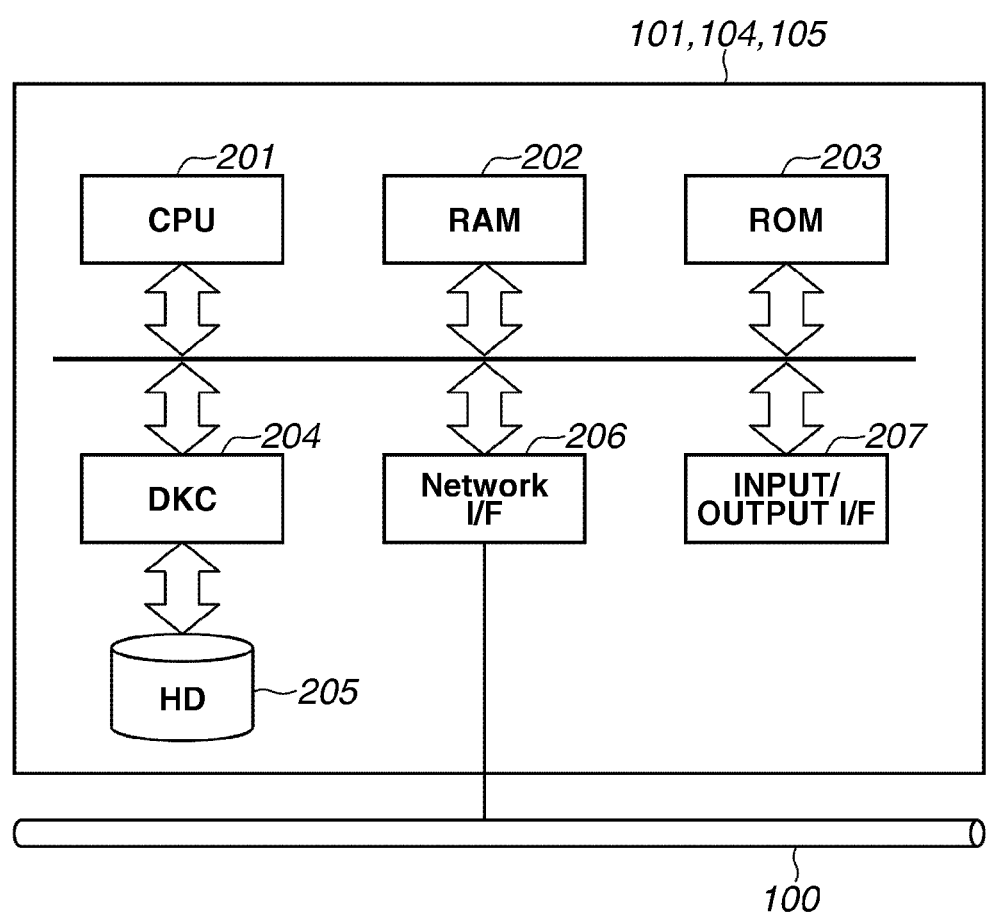
FIG. 2 illustrates an example hardware configuration of a management apparatus, a function provision apparatus, and a client apparatus.

An example hardware configuration and an example software configuration of each apparatus included in the management system will be described in detail below. FIG. 2 illustrates an example hardware configuration of the management apparatus 101, the function provision apparatus 104, and the client apparatus 105.

A system bus 200 is a common path for data communication among components included in a computer. A central processing unit (CPU) 201 controls the operation of the entire computer and executes calculation necessary for the operation. A random access memory (RAM) 202 functions as a temporary storage area for temporarily storing a program and data used in processing as a work area for the CPU 201. A read-only memory (ROM) 203 stores a program, such as a system boot program.

A disk controller (DKC) 204 controls an external storage device, such as a hard disk (HD) 205. The HD 205 stores a program and data. The CPU 201 loads the program and data necessary for processing from the RAM 202 and the HD 205. A network interface (I/F) 206 is connected to the network 100 and is used in executing a communication via the network 100.

The input/output I/F 207 is connected to a keyboard, a mouse, and a display. Data can be input and output via the input/output I/F 207. The management apparatus 101 operates in a state where the CPU 201 executes a basic input/output (I/O) program and an operating system (OS). The basic I/O program is stored on the ROM 203. The OS is stored on the HD 205.

When the computer is powered on, a load function of an initial program included in the basic I/O program loads the OS from the HD 205 onto the RAM 202 to start the operation of the OS.

Figure 3:
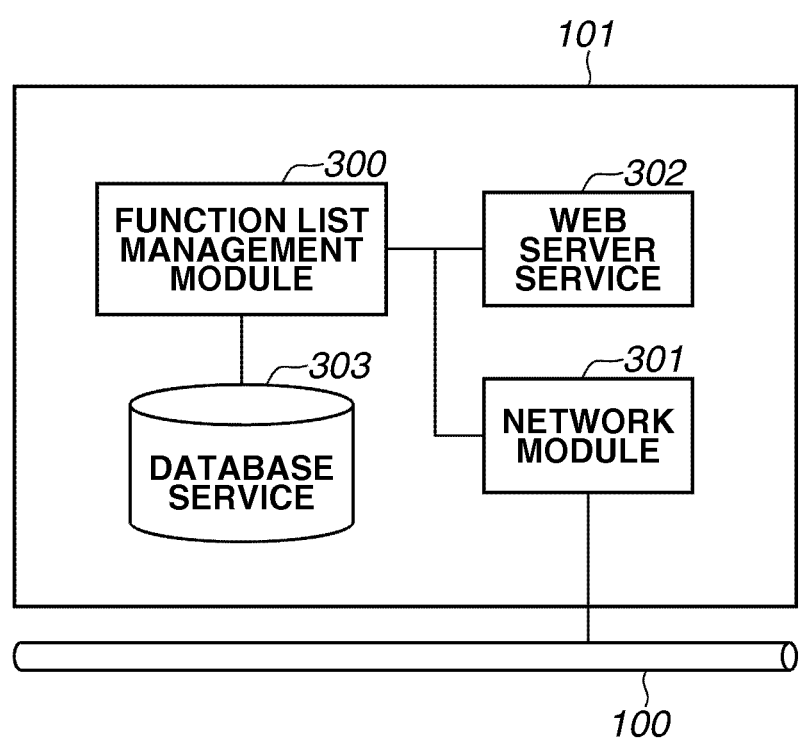
FIG. 3 illustrates an exemplary software configuration of a management apparatus.

FIG. 3 illustrates an example software configuration of the management apparatus 101.

For a software configuration of the management apparatus 101, the management apparatus 101 includes a function list management module 300, which is configured to manage a list of functions, a network module 301, a web server service 302, and a database service 303. The software configuration illustrated in FIG. 3 is stored on the HD 205 as a program and is executed by the CPU 201.

The function list management module 300 executes message transmission and receiving processing for requesting a list of available functions of the image forming apparatuses 102 and 103 and the function provision apparatus 104 from each apparatus. The function list acquired by the message transmission and receiving processing is registered by the function list management module 300 to the database service 303. In addition, the function list management module 300 executes generation processing to provide the acquired function list by using the web server service 302. More specifically, the function list management module 300 provides a display illustrated in FIG. 12, which will be described in detail below.

The generated function list is stored by the function list management module 300 on the HD 205. The network module 301 executes a communication with the image forming apparatuses 102 and 103, the function provision apparatus 104, and the client apparatus 105, which are connected to the Internet, via the network 100.

When a GET request is received via a web browser 701 of the client apparatus 105 by hypertext transport protocol (HTTP), the web server service 302 provides a service for replying web page data stored on the HD 205. The client apparatus 105 is externally connected with the management apparatus 101 via the network 100, and the client apparatus 105 can utilize the service provided by the web server service 302.

With the above-described configuration, the function list management module 300 and the web server service 302 implement a web application configured to manage the image forming apparatuses 102 and 103. The database service 303 registers information acquired from the external apparatus, such as the image forming apparatus 102 or 103, and reads information necessary for generating a web page provided by the web server service 302. If the database service 303 can be accessed from the function list management module 300, the database service 303 can be located on an apparatus different from the management apparatus 101.

Figure 4:
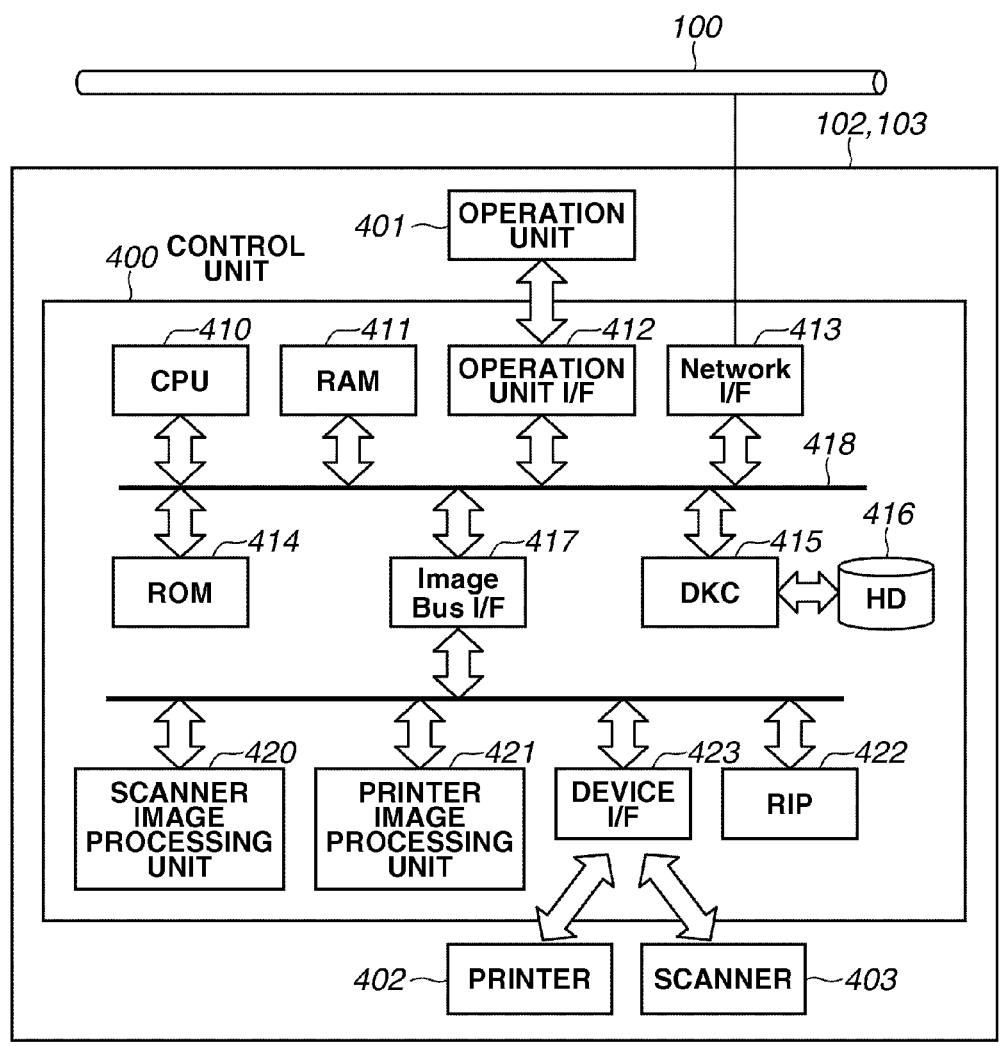
FIG. 4 illustrates an example hardware configuration of an image forming apparatus.

FIG. 4 illustrates an example hardware configuration of the image forming apparatuses 102 and 103. Referring to FIG. 4, each of the image forming apparatuses 102 and 103 includes a control unit 400, an operation unit 401, a printer 402, and a scanner 403.

As a configuration of the control unit 400 for an operation unit thereof, the control unit 400 includes a CPU 410, a RAM 411, an operation unit I/F 412, a network I/F 413, a ROM 414, a DKC 415, an HD 416, an image bus I/F 417, and a system bus 418. As a configuration of the control unit 400 for printing and scanning, the control unit 400 includes an image bus 419, a scanner image processing unit 420, a printer image processing unit 421, an RIP 422, and a device I/F 423. Among the above-described configuration, the scanner 403 and the scanner image processing unit 420 are provided if necessary.

The CPU 410 is a controller configured to control the operation of the entire control unit 400. The RAM 411 is an image memory configured to temporarily store image data. The operation unit I/F 412 is an interface with the operation unit 401. The operation unit I/F 412 outputs an image data to be displayed on the operation unit 401 to the operation unit 401. In addition, the operation unit I/F 412 is configured to transmit information input by the user via the operation unit 401 to the CPU 410.

The network I/F 413, which is connected to the network 100, is an interface for data communication with the external apparatus via the network 100. In addition, the network I/F 413 includes a management information base (MIB), which stores various information about the image forming apparatuses 102 and 103. The various information included in the MIB includes an Internet protocol (IP) address, a name of the image forming apparatus, and status information about the image forming apparatus.

The ROM 414 is a boot ROM configured to store the system boot program. The DKC 415 controls the HD 416. The HD 416 is an external storage device configured to store system software and image data. The image bus I/F 417 is an interface between the system bus 418 and the image bus 419. The image bus I/F 417 is a bus bridge for data conversion. The system bus 418 is a common path for a data communication among the components included in the control unit 400.

The image bus 419 is constituted by a peripheral component interconnect (PCI) bus or Institute of Electrical and Electronic Engineers (IEEE) 1394. The image bus 419 is a path for transferring image data at a high speed. The scanner image processing unit 420 corrects, image-processes, and edits an input image. The printer image processing unit 421 executes correction and resolution conversion on a print output image data according to the performance of the printer.

The RIP 422 rasterizes a page description language (PDL) command received via the network 100 into a bitmap image. The device I/F 423 is an interface between the printer 402 as an image output device and the control unit 400. In addition, the device I/F 423 is also an interface between the scanner (image input device) 403 and the control unit 400. The device I/F 423 executes synchronous/asynchronous conversion of image data.

Figure 5:
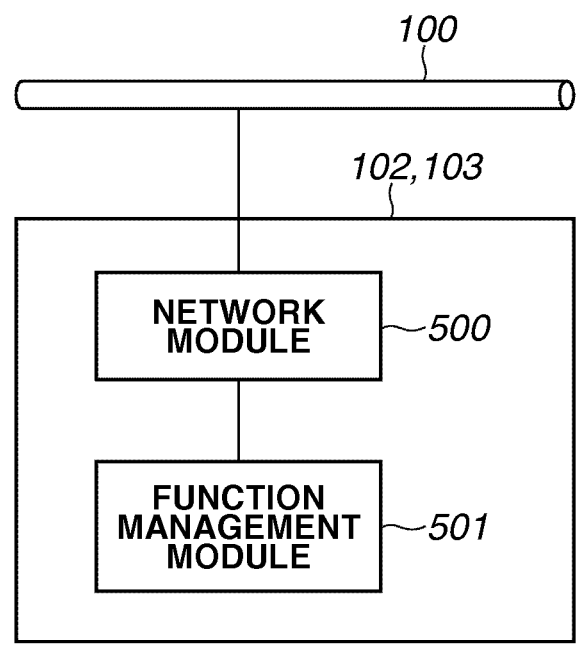
FIG. 5 illustrates an example software configuration of an image forming apparatus.

FIG. 5 illustrates an example software configuration of the image forming apparatuses 102 and 103. The software configuration illustrated in FIG. 5 is stored on the HD 416 as a program, and is executed by the CPU 410.

Referring to FIG. 5, a network module 500 functions as an interface with the external apparatuses (the management apparatus 101, the function provision apparatus 104, and the client apparatus 105) connected to the network 100. More specifically, the network module 500 receives a function list acquisition request from the management apparatus 101. Subsequently, the network module 500 issues a request to a function management module 501 for transmitting function information necessary for issuing a reply.

The function list acquisition request can be executed by transmitting and receiving information using the MIB or a Simple Object Access Protocol (SOAP) message. In addition, the network module 500 receives function information and transmits a reply to the management apparatus 101 via the network 100.

The function management module 501 is configured to manage functions of the image forming apparatuses 102 and 103. The function management module 501 returns function information stored on the RAM 411 or the HD 416 to the network module 500 in response to the request received from the network module 500. For an apparatus whose function is externally provided (i.e., the image forming apparatus 103), the function management module 501 transmits and receives function information to and from the function provision apparatus 104 via the network module 500.

Figure 6:
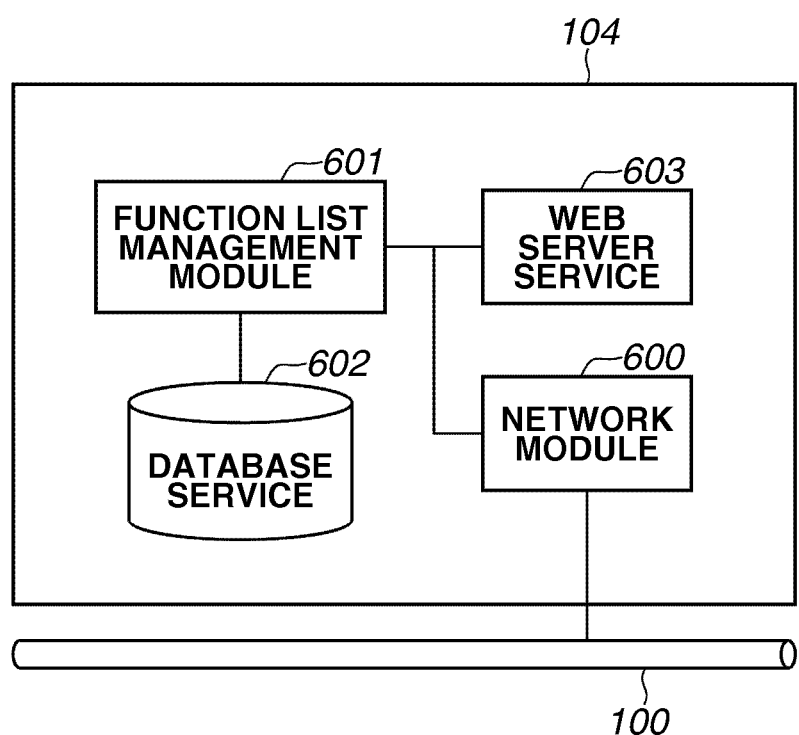
FIG. 6 illustrates an example software configuration of a function provision apparatus.

FIG. 6 illustrates an example software configuration of the function provision apparatus 104. As the software configuration thereof, the function provision apparatus 104 includes a network module 600, a function list management module 601, and a database service 602. The software configuration illustrated in FIG. 6 is stored on the HD 205 as a program, and is executed by the CPU 201.

The network module 600 functions as an interface with the management apparatus 101 and the image forming apparatus 103 connected to the network 100. More specifically, the network module 600 receives a function operation status verification request from the image forming apparatus 103. In addition, the network module 600 issues a request for acquiring function information and the function operation status to the function list management module 601. In addition, the network module 600 transmits the function information acquired by the function list management module 601 to the image forming apparatus 103 as a reply.

In response to the function operation status verification request from the image forming apparatus 103 and the management apparatus 101, the function list management module 601 acquires information from a provided function registered to the database service 602. If more detailed information is necessary, the function list management module 601 acquires information from the RAM 202 and the HD 205.

The database service 602 manages a function provided by the function provision apparatus 104. The management that the database service 602 executes includes acquisition of necessary information and processing for adding and registering a new function, which are executed in response to an externally input request. If the database service 602 can be accessed from a function verification module, the database service 602 can be located on an apparatus different and separate from the function provision apparatus 104.

A web server service 603 publicizes the function managed by the function provision apparatus 104 as a service. In utilizing the function from the image forming apparatuses 102 and 103, the function can be utilized by accessing the web server service 603 included in the function provision apparatus 104 from the image forming apparatuses 102 and 103.

Figure 7:
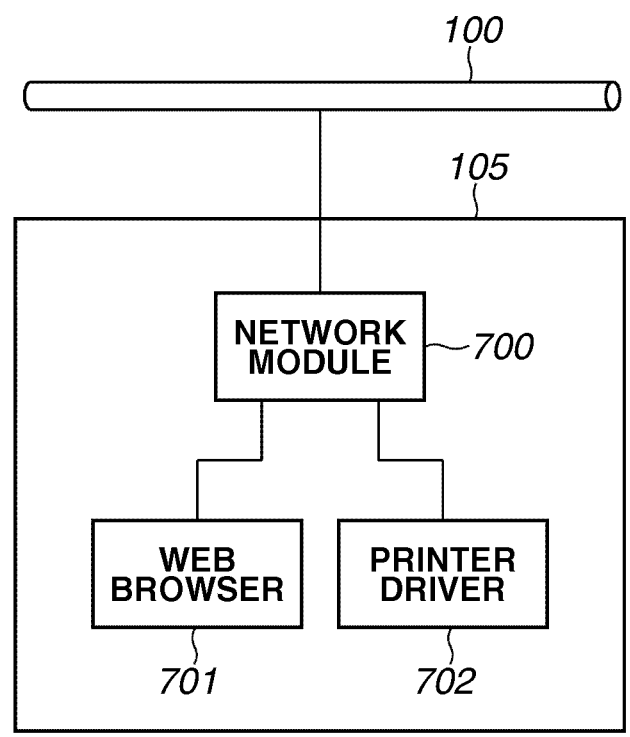
FIG. 7 illustrates an example software configuration of a client apparatus.

FIG. 7 illustrates an example software configuration of the client apparatus 105.

Referring to FIG. 7, the network module 700 functions as an interface between the client apparatus 105 and each of the management apparatus 101 and the image forming apparatuses 102 and 103 connected to the network 100. A web browser 701 is written on the HD 205 as a program. The web browser 701 is written onto the RAM 202 on the OS, and is executed by the CPU 201.

The client apparatus 105 can access the management apparatus 101 via the network module 700 by utilizing the web browser 701. A printer driver 702 issues a print request to the image forming apparatuses 102 and 103 via the network module 700.

FIG. 8A illustrates an example of a function list acquisition request processing executed by the management apparatus 101 according to the present exemplary embodiment. The operation of the processing illustrated in the flow chart of FIG. 8A is primarily controlled and executed by the function list management module 300.

Referring to FIG. 8A, in step S800, the function list management module 300 requests the image forming apparatuses 102 and 103 to transmit a list of available functions. Processing for issuing the function list request will be described in detail below with reference to FIG. 9. In step S801, the function list management module 300 acquires a function list generated by the image forming apparatuses 102 and 103. The list acquired in step S801 is registered to and stored on the database service 303 and the HD 205 of the management apparatus 101.

Figure 12A:
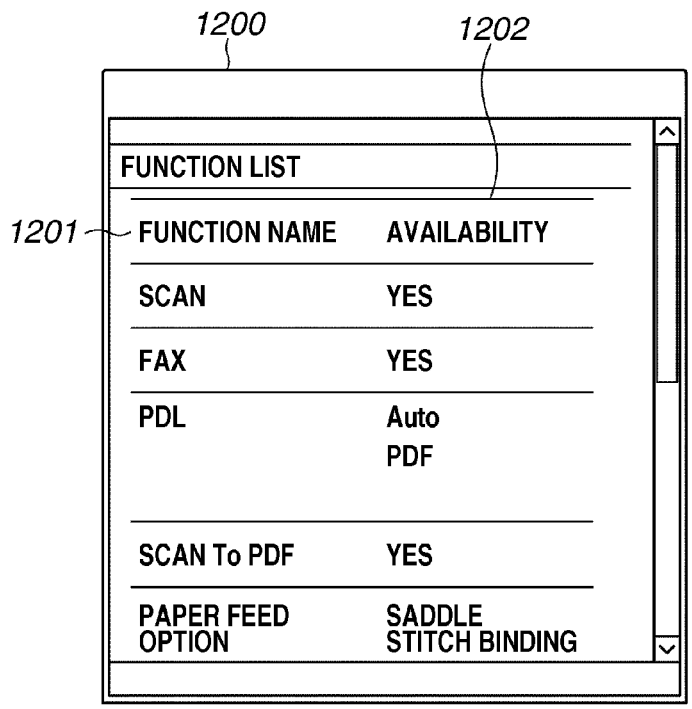
FIGS. 12A and 12B illustrate examples of a function list display screen displayed on a management apparatus.
Figure 12B:
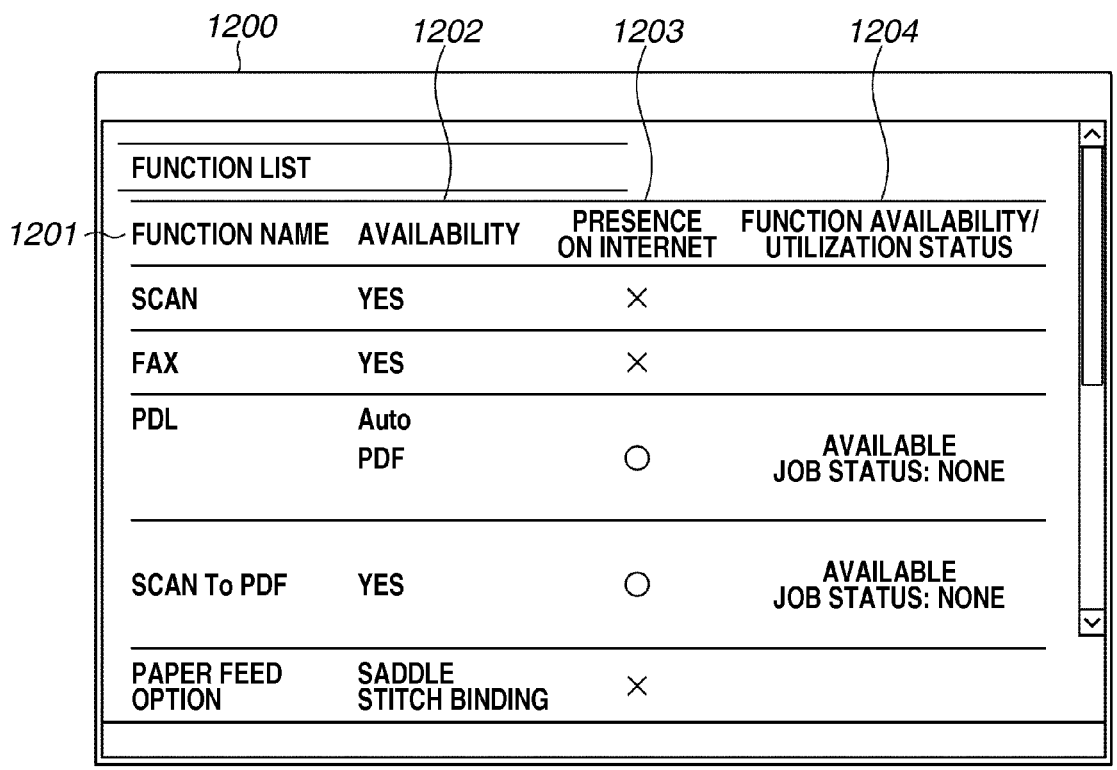

In step S802, the function list management module 300 displays the function list received in step S801 by using the web service. The display in step S802 is executed by the web browser 701 of the client apparatus 105. For example, a display illustrated in FIG. 12A or 12B is displayed in step S802.

Figure 9:
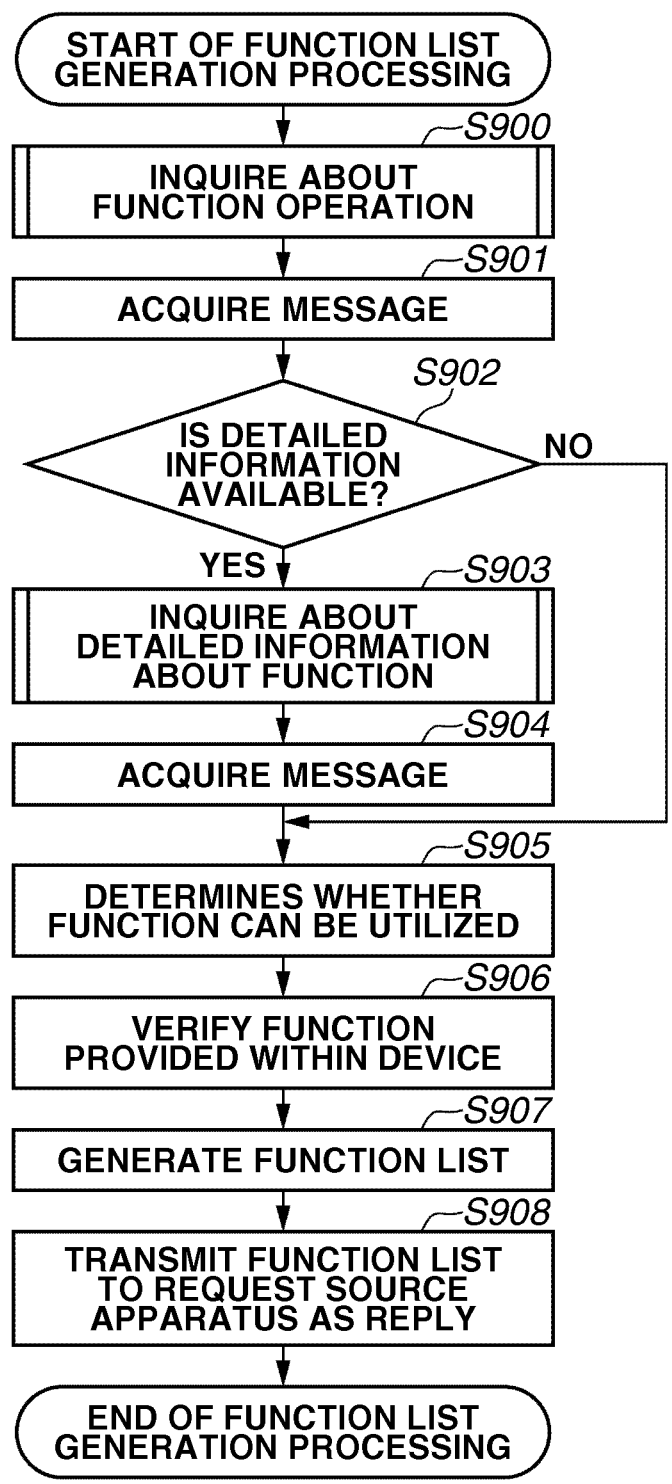
FIG. 9 is a flow chart illustrating example function list generation processing executed by an image forming apparatus.

FIG. 9 is a flow chart illustrating an example flow of function list generation processing executed by the image forming apparatus 103. The operation of the processing illustrated in the flow chart of FIG. 9 is primarily controlled, and executed by the function management module 501.

Referring to FIG. 9, in step S900, the function management module 501 verifies whether the function provided on the function provision apparatus 104 is operable. More specifically, in step S900, in addition to verifying whether a communication is available by merely inputting a test packet, the function management module 501 can communicate with the web server service 603 of the function provision apparatus 104 to verify how detailed the available function information is. In other words, the function management module 501 can receive information describing that the status of progress of a job processed by a specific function can be returned.

In step S901, the function management module 501 acquires a message replied in response to the operation status inquiry in step S900. In step S902, the function management module 501 determines whether detailed information can be acquired from the function provision apparatus 104 according to the message acquired in step S901. If it is determined that detailed information can be acquired (Yes in step S902), then the processing proceeds to step S903. On the other hand, if it is determined that detailed information cannot be acquired but the operation status only can be acquired (No in step S902), then the processing proceeds to step S905.

In step S903, the function management module 501 acquires the detailed information about the function provided on the function provision apparatus 104 from the function provision apparatus 104. The detailed information acquired in step S903 includes job traffic status and wait time for starting a job, which is calculated by the function provision apparatus 104. However, the detailed information acquired in step S903 is not limited to this. More specifically, the detailed information acquired in step S903 can include information other than the above-described information.

In step S904, the function management module 501 acquires a message generated by the function provision apparatus 104 in response to the inquiry in step S903. In step S905, the function management module 501 determines whether the image forming apparatus 103 can utilize the desired function based on the messages acquired in steps S901 and S904. More specifically, if the information included in the message acquired in step S901 describes that the communication is available, then, the function management module 501 determines that the desired function is available.

In step S906, the function management module 501 determines whether the function provided based on the program stored on the HD 205 of the image forming apparatus 103 can be utilized. More specifically, the function management module 501 determines whether the function can be utilized based on information about whether the software that provides the function is currently in operation.

In step S907, the function management module 501 generates a function list based on the function operation status information and the function availability information acquired in steps S905 and S906. In step S908, the function management module 501 transmits the generated function list to the request source apparatus. As a result, a display of the function list illustrated in FIG. 12B can be provided.

In the present exemplary embodiment, a part of the functions of the image forming apparatus 103 is located on the function provision apparatus 104. However, the present exemplary embodiment can be implemented on an image forming apparatus whose all functions are entirely included in the image forming apparatus itself, i.e., on the image forming apparatus 102. If the processing illustrated in FIG. 9 is executed by the image forming apparatus 102, the processing in steps S901 through S905 can be omitted, and only the processing in step S906 and after can be executed.

FIG. 10 is a flow chart illustrating an example flow of processing for replying the function operation status/detailed information, which is executed by the function provision apparatus 104. The operation of the processing illustrated in the flow chart of FIG. 10 is primarily controlled and executed by the function list management module 601.

Referring to FIG. 10, in step S1000, the function list management module 601 determines which of the function operation status and the function detailed information has been requested. If the function operation status has been requested as in step S900 ("Function Operation Status" in step S1000), then the processing proceeds to step S1001. On the other hand, if the function detailed information has been requested as in step S903 ("Function Detailed Information" in step S1000), then the processing proceeds to step S1003.

In step S1001, the function list management module 601 verifies the function provided by the function provision apparatus 104 by referring to the function information registered to the database service 602. In addition, the function list management module 601 generates a message including verified function information. In verifying the operation status of the function, the function list management module 601 can include information describing that information other than the availability of the communication can be replied in the message.

After generating the message, in step S1002, the function list management module 601 transmits the message to the request source as a reply. In step S1003, the function list management module 601 acquires the information registered to the database service 602 and the information stored on the HD 205. In addition, the function list management module 601 generates a message to be replied to the request source. After the function list management module 601 has generated the message, the processing proceeds to step S1002.

FIG. 11 is a flow chart illustrating an example flow of the entire information processing according to the present exemplary embodiment. The processing illustrated in FIG. 11 is a mere outline. In other words, a part of the processing illustrated in FIG. 11 can be omitted. In addition, processing not illustrated in FIG. 11 can be added thereto. For easier understanding, the processing corresponding to the processing described above with reference to FIGS. 8A, 9, and 10 only is described in the example illustrated in FIG. 11 and the detailed description thereof will not be repeated here.

Referring to FIG. 11, in step S1100, the management apparatus 101 issues a request for a list of available functions to the image forming apparatuses 102 and 103. The processing in step S1100 corresponds to the processing in step S800 in FIG. 8A. The request is an example of a function list acquisition request. The processing in steps S1101 through S1108 corresponds to the function list generation processing executed by the image forming apparatus 103 illustrated in FIG. 9. In step S1109, the function list acquired by the management apparatus 101 from the image forming apparatuses 102 and 103 is presented to the user. The processing in step S1109 corresponds to the processing in step S802 in FIG. 8A.

FIG. 12A illustrates an example screen displayed when the function of an image forming apparatus is located within the image forming apparatus itself as the image forming apparatus 102. Referring to FIG. 12A, a window 1200 displays a function list screen. In the present exemplary embodiment, it is supposed that the window 1200 is displayed by the web browser 701 of the client apparatus 105. However, alternatively, a form can be displayed by a native application instead.

A column 1201 displays a function name. The function provided by the image forming apparatus 102 is displayed in the function name column 1201. A column 1202 displays information about what type of processing can be utilized by utilizing the function displayed in the function name column 1201. In the example illustrated in FIG. 12A, the availability column 1202 displays information describing that the image forming apparatus on which the information is displayed can utilize a saddle stitch binding option as a paper feed option.

In the present exemplary embodiment, the display illustrated in FIG. 12A is not limited to the information displayed in the columns illustrated in FIG. 12A. In other words, any appropriate information can be displayed on the window 1200. FIG. 12B illustrates an example of a screen displayed for an image forming apparatus such as the image forming apparatus 103 whose part of functions is located to an external apparatus, such as the function provision apparatus 104. In the example illustrated in FIG. 12B, the window 1200, the function name column 1201, and the availability column 1202 are the same as those illustrated in FIG. 12A. Accordingly, the detailed description thereof will not be repeated here.

Because a part of the functions of the image forming apparatus 103 is externally provided (on the Internet (on the function provision apparatus 104)), in the example illustrated in FIG. 12B, a column 1203 displays information for determining whether the function is located on the Internet. Among the functions of the image forming apparatus 103 to be provided to the client apparatus 105, a circle ("o") is assigned to a function located on the Internet. On the other hand, the function located within the image forming apparatus 103 is assigned with a cross ("x").

For example, in the example illustrated in FIG. 12B, the scan function is provided as an internal function of the image forming apparatus 103. On the other hand, the "scan to PDF" function is located on the Internet.

A column 1204 indicates the actual availability of the function located on the Internet. In addition, the column 1204 indicates the traffic status of the functions located on the Internet. For example, by referring to the function actual availability column 1204 corresponding to the function name column 1201 for the scan to PDF function, it can be known that the scan to PDF function is actually available. To paraphrase this, it can be known by referring to the function actual availability column 1204 for the scan to PDF function that the scan to PDF function can be utilized now because the job traffic is free. The display in the column 1204 illustrated in FIG. 12B is a mere example. In other words, estimated time until the function becomes available can be displayed instead.

In the example illustrated in FIG. 12B, the display for the function availability for the function located within the image forming apparatus is left blank. However, alternatively, in this case, a job utilization status can be displayed. In the present exemplary embodiment, the display illustrated in FIG. 12B is not limited to the information displayed in the columns illustrated in FIG. 12B. In other words, any appropriate information can be displayed on the window 1200.

According to the present exemplary embodiment having the above-described configuration, the management apparatus 101 can appropriately manage the operation status of the function of the image forming apparatus 103 located on the Internet in addition to the function of the image forming apparatus 102.

In the first exemplary embodiment described above, the function list is requested and acquired from the image forming apparatus and the list of functions provided by the image forming apparatus is displayed. To paraphrase this, the first exemplary embodiment acquires the list of functions from the image forming apparatus and displays the acquired function list as it is.

For the acquisition result, as well as displaying the acquired function list as it is, the management apparatus can determine the acquired function list and verify the acquisition result (the content of the function list) to the image forming apparatus or the function provision apparatus. In a second exemplary embodiment of the present invention, a method for verifying the result of acquisition from the image forming apparatus and displaying the acquisition result will be described in detail below.

The present exemplary embodiment has the configuration of the entire system similar to that of the first exemplary embodiment. In addition, in the present exemplary embodiment, the management apparatus 101, the image forming apparatuses 102 and 103, the function provision apparatus 104, and the client apparatus 105 have the hardware configuration and the software configuration similar to those of the corresponding apparatus of the first exemplary embodiment. Accordingly, the detailed description thereof will not be repeated here. Furthermore, the present exemplary embodiment executes the function list generation processing (illustrated in FIG. 9 in the first exemplary embodiment) and the function operation status and detailed information reply processing (illustrated in FIG. 10 in the first exemplary embodiment) similar to those of the first exemplary embodiment described above. Accordingly, the detailed description thereof will not be repeated here.

FIG. 8B is a flow chart illustrating an example flow of function list acquisition request processing executed by the management apparatus 101. The processing in steps S800 through S802 is similar to the processing illustrated in FIG. 8A. Accordingly, the detailed description thereof will not be repeated here. The operation of the processing illustrated in the flow chart of FIG. 8B is primarily controlled and executed by the function list management module 300.

Referring to FIG. 8B, in step S803, the function list management module 300 determines whether a function located on the Internet exists in the function list acquired in step S801. If it is determined that a function located on the Internet exists (Yes in step S803), then the processing proceeds to step S804. On the other hand, if it is determined that no function located on the Internet exists (No in step S803), then the processing proceeds to step S802.

In step S804, the function list management module 300 determines whether the function located on the Internet included in the function list is available. If the function is available (NO in step S804), then the processing proceeds to step S802. On the other hand, if the function is not available (YES in step S804), then the processing proceeds to step S805. In step S805, the function list management module 300 determines whether the function is not available due to a communication failure between the image forming apparatus 103 and the function provision apparatus 104 or due to a failure in the function provision apparatus 104.

More specifically, in step S805, the function list management module 300 executes processing for inquiring about the operation that cannot be utilized by the management apparatus 101 from the function provision apparatus 104. In other words, in step S805, the availability of communication is verified. Alternatively, in step S805, the function list management module 300 can communicate with the web server service 603 of the function provision apparatus 104 to verify how detailed the available function information is.

In step S806, the function list management module 300 acquires a message from the function provision apparatus 104 in response to the function operation status inquiry in step S805. In step S807, the function list management module 300 determines whether the function located on the Internet is available according to the message acquired from function provision apparatus 104 in step S806.

If it is determined that the function located on the Internet is available (Yes in step S807), then the processing proceeds to step S808 because the result of the determination in step S807 does not match the result of the determination in step S804. In step S808, the function list management module 300 verifies the availability of the communication between the image forming apparatus 103 and the function provision apparatus 104. On the other hand, if it is determined that the function located on the Internet is not available (No in step S807), then the processing proceeds to step S802 because the result of the determination in step S807 matches the result of the determination in step S804. In step S802, the function list management module 300 execute control for displaying a message indicating that the communication between the image forming apparatus 103 and the function provision apparatus 104 is not available.

In step S808, the function list management module 300 requests the function list from the image forming apparatus 103 again. In step S809, the function list management module 300 acquires a reply to the request in step S808.

FIG. 13 is a flow chart illustrating an example flow of the entire information processing according to the present exemplary embodiment. The processing illustrated in FIG. 13 is a mere outline. In other words, a part of the processing illustrated in FIG. 13 can be omitted. In addition, processing not illustrated in FIG. 13 can be added thereto. For easier understanding, in the example illustrated in FIG. 13, the communication between the image forming apparatus 103 and the function provision apparatus 104 is simply referred to as a "connection relationship A". In addition, the communication between the management apparatus 101 and the function provision apparatus 104 is simply referred to as a "connection relationship B". Furthermore, for easier understanding, the processing corresponding to the processing described above with reference to FIGS. 8A, 9, and 10 only is described in the example illustrated in FIG. 13, and the detailed description thereof will not be repeated here.

Referring to FIG. 13, processing in steps S1300 through S1308 is similar to the corresponding processing illustrated in FIG. 11. In other words, in steps S1300 through S1308, the management apparatus 101 requests and acquires the function list from the image forming apparatuses 102 and 103. In step S1309, the management apparatus 101 determines whether the function located on the Internet, among the functions included in the function list acquired in step S1308, is available. The processing in step S1309 corresponds to the determination processing in step S804 (FIG. 8B).

In step S1310, the management apparatus 101 sets a message displayed in the connection relationship A when the function located on the Internet is available. By executing the processing in step S1310, the management apparatus 101 can present information to the user which indicates that the function located on the Internet is available. The processing in steps S1311 through S1317 is executed if the function located on the Internet is not available in the connection relationship A. In step S1311, the management apparatus 101 verifies the status of communication for the function by directly accessing the function provision apparatus 104. The processing in step S1311 corresponds to the processing in step S805 (FIG. 8B).

In step S1312, the management apparatus 101 receives a reply to the inquiry in step S1311. The processing in step S1312 corresponds to the processing in step S1002 (FIG. 10) and S806 (FIG. 8B). In step S1313, the management apparatus 101 determines whether the function located on the Internet is available according to the reply acquired from the function provision apparatus 104 in step S1312 again. The processing in step S1313 corresponds to the processing in step S807 (FIG. 8B).

In step S1314, the management apparatus 101 requests the function list from the image forming apparatus 103 again. The processing in step S1314 corresponds to the processing in step S808 (FIG. 8B). In step S1315, the image forming apparatuses 102 and 103 verify the function operation status information and the function detailed information and reply the processing result to the management apparatus 101. In step S1316, the management apparatus 101 sets a message displayed if the function located on the Internet is not available in the connection relationship A, and if the function located on the Internet is available in the connection relationship B.

More specifically, in step S1316, the management apparatus 101 sets the message according to the acquired function list again. If it is determined that the function is available as a result of the verification executed again, then the processing proceeds to step S1317. In step S1317, the management apparatus 101 sets a message "the communication may be unavailable", for example. If the function is not available, the management apparatus 101 sets a message "device communication may be unavailable", for example.

In step S1318, the management apparatus 101 provides the function list to the user together with the information indicating the availability of the function. As described above, the management apparatus 101 can execute the determination on the function list acquired from the image forming apparatus 103, verify whether the function is available by issuing an inquiry to the image forming apparatus 103 and the function provision apparatus 104 again, and display the result of the function availability verification.

In the first and the second exemplary embodiments described above, the management apparatus positively acquires the function list. However, the management method executed according to the operation status of the function located on the Internet is not limited to the acquisition of the information from the management apparatus. In other words, the function information can be acquired from the client apparatus. In a third exemplary embodiment of the present invention, a function management method executed when the user has requested printing on the client apparatus will be described in detail below.

The present exemplary embodiment has the configuration of the entire system similar to that of the first exemplary embodiment. In addition, in the present exemplary embodiment, the management apparatus 101, the image forming apparatuses 102 and 103, the function provision apparatus 104, and the client apparatus 105 have the hardware configuration and the software configuration similar to those of the corresponding apparatus of the first exemplary embodiment. Accordingly, the detailed description thereof will not be repeated here. Furthermore, the present exemplary embodiment executes the function operation status and detailed information reply processing (illustrated in FIG. 10 in the first exemplary embodiment) similar to that of the first exemplary embodiment described above. Accordingly, the detailed description thereof will not be repeated here.

Figure 14:
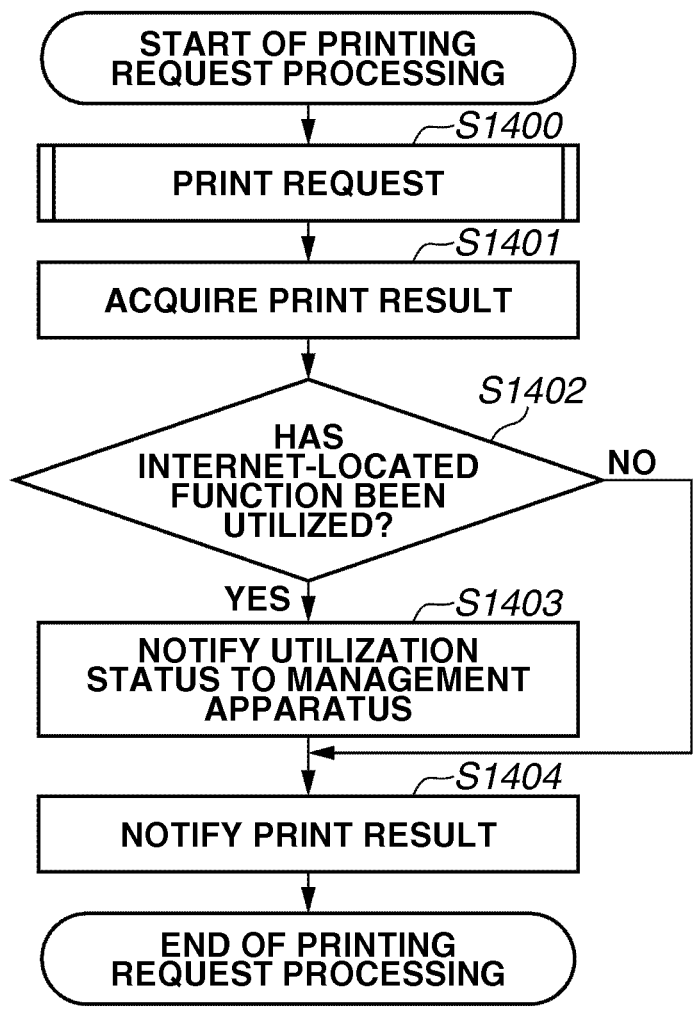
FIG. 14 is a flow chart illustrating an example processing of a print request executed by a client apparatus.

FIG. 14 is a flow chart illustrating an example flow of processing for requesting printing, which is executed by the client apparatus 105. The operation of the processing illustrated in the flow chart of FIG. 14 is primarily controlled and executed by the printer driver 702, which is installed on the client apparatus 105.

Referring to FIG. 14, in step S1400, the printer driver 702 issues a print request to the image forming apparatuses 102 and 103. In step S1401, the printer driver 702 acquires the result of the print request in step S1400. In step S1402, the printer driver 702 determines whether the image forming apparatuses 102 and 103 have utilized the function on the Internet according to the acquired print result.

If it is determined that the function located on the Internet has been utilized (Yes in step S1402), then the processing proceeds to step S1403. On the other hand, if it is determined that the function located on the Internet has not been utilized (No in step S1402), then the processing proceeds to step S1404. In step S1403, the printer driver 702 notifies the result of the determination as to whether the function located on the Internet has been utilized, to the management apparatus 101. In step S1304, the printer driver 702 notifies the print result to the user.

Figure 15:
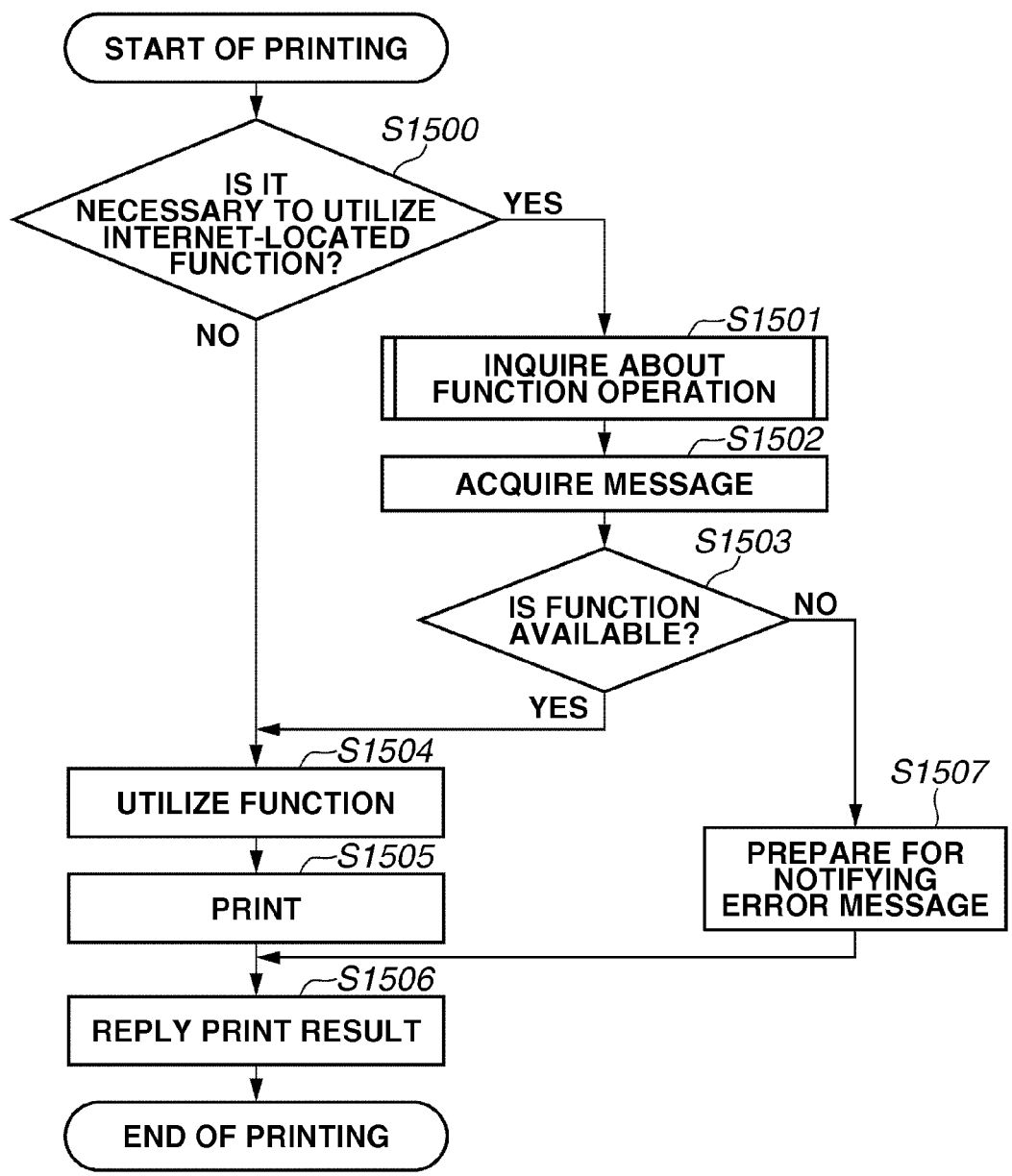
FIG. 15 is a flow chart illustrating example print processing executed by an image forming apparatus.

FIG. 15 is a flow chart illustrating an example flow of print processing executed by the image forming apparatus 103. Referring to FIG. 15, in step S1500, the image forming apparatus 103, in response to the print request, determines whether it is necessary to utilize the function located on the Internet. If it is necessary to utilize the function located on the Internet (Yes in step S1500), then the processing proceeds to step S1501. On the other hand, if it is not necessary to utilize the function located on the Internet (No in step S1500), then the processing proceeds to step S1504.

In step S1501, the image forming apparatus 103 requests the function provision apparatus 104 to transmit the operation status of the function located on the function provision apparatus 104. In step S1502, the image forming apparatus 103 acquires the message from the function provision apparatus 104 in response to the request in step S1501. In step S1503, the image forming apparatus 103 determines whether the function can be utilized according to the message acquired in step S1502.

If it is determined that the function can be utilized (Yes in step S1503), then the processing proceeds to step S1504. On the other hand, if it is determined that the function cannot be utilized (No in step S1503), then the processing proceeds to step S1507. In step S1504, the image forming apparatus 103 actually utilizes the function necessary for the print processing. If the function located on the Internet or the function located within the image forming apparatus is not to be utilized, then the processing proceeds to step S1505.

In step S1505, the image forming apparatus 103 executes printing according to the processing result in step S1504. In step S1506, the image forming apparatus 103 replies the print result to the request source apparatus. In step S1507, the image forming apparatus 103 prepares an error notification message describing that the function on the Internet is not available. The error notification message is transmitted to the request source apparatus as the print result in step S1506.

Figure 16:
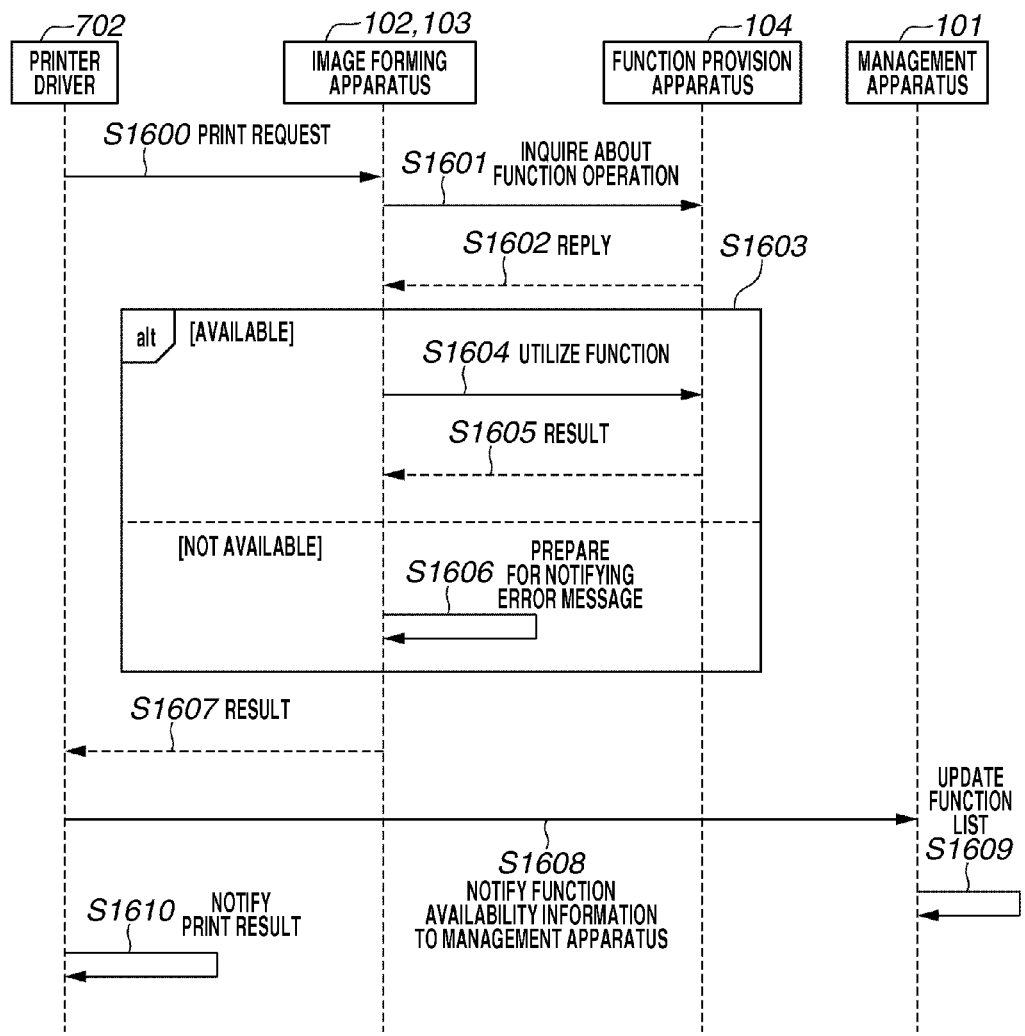
FIG. 16 is a flow chart illustrating example information processing according to a third exemplary embodiment of the present invention.

FIG. 16 is a flow chart illustrating an example flow of the entire information processing according to the present exemplary embodiment. The processing illustrated in FIG. 16 is a mere outline. In other words, a part of the processing illustrated in FIG. 16 can be omitted. In addition, processing not illustrated in FIG. 16 can be added thereto.

Referring to FIG. 16, in step S1600, the printer driver 702 transmits the print request to the image forming apparatuses 102 and 103. The processing in step S1600 corresponds to the processing in step S1400 (FIG. 14). In step S1601, the image forming apparatus 103, in utilizing the function located on the Internet, verifies whether the function is available by accessing the function provision apparatus 104. The processing in step S1601 corresponds to the processing in step S1501 (FIG. 15).

In step S1602, the image forming apparatus 103 receives a reply as to whether the function whose availability has been verified in step S1601 is available, from the function provision apparatus 104. The processing in step S1603 corresponds to the processing in step S1503 (FIG. 15). In other words, the processing branches from step S1603 according to the reply to the function availability inquiry in step S1602.

In step S1604, the image forming apparatus 103 actually utilizes the function. In step S1605, the image forming apparatus 103 receives the result of the processing executed by utilizing the function located on the Internet from the function provision apparatus 104. More specifically, if the function for converting data into PDF data is provided on the Internet, a PDF file is acquired as a result of the processing in step S1605. Processing in step S1606 is executed if the function is not available. More specifically, in step S1606, the image forming apparatus 103 prepares an error notification message to be presented to the user.

In step S1607, the image forming apparatus 103 transmits the result of the processing executed by utilizing the function or the information necessary for presenting the error notification message to the printer driver 702. In step S1608, the printer driver 702 notifies the information about whether the function is available, which is the result of the determination in step S1603, to the management apparatus 101. In step S1609, the management apparatus 101 updates the function list based on the notified information.

In step S1610, the printer driver 702 provides the print result to the user. The processing in steps S1609 and S1610 can be asynchronously executed.

With the above-described configuration, according to the present exemplary embodiment, the management apparatus 101 acquires the function information from the printer driver 702 of the client apparatus 105 and can manage the function according to the operation status of the function located on the Internet.

According to each exemplary embodiment of the present invention described above, the list of functions that can be provided by the image forming apparatus that provides the function to the client apparatus by utilizing the function provided by the function provision apparatus can be appropriately managed.

Aspects of the present invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-166156 filed Jul. 23, 2010, which is hereby incorporated by reference herein in its entirety.

What is claimed is:

1. A management system including an image forming apparatus having a scan function and a management apparatus configured to manage the image forming apparatus, wherein the management apparatus is configured to transmit, to the image forming apparatus, a function list acquisition request for acquiring a function list of functions provided by the image forming apparatus, wherein the image forming apparatus comprises:
one or more memory devices storing instructions for execution by one or more processors; and
the one or more processors, operable when executing the instructions to:
if the function list acquisition request is received from the management apparatus, issue a first inquiry, to a function provision apparatus on an Internet about an operation status of a function provided by the function provision apparatus, wherein the function provided by the function provision apparatus is a part of the functions provided by the image forming apparatus and a function for a conversion process of data read by the scan function of the image forming apparatus;
if a reply to the first inquiry is received from the function provision apparatus via the Internet, generate a function list based on both information about the function which the function provision apparatus can provide to the image forming apparatus according to the operation status included in the reply to the first inquiry and information about the scan function provided by the image forming apparatus without the function provision apparatus; and
transmit the generated function list to the management apparatus, and
wherein the management apparatus is configured to control display of a first function corresponding to the scan function of the image forming apparatus and second functions provided by the image forming apparatus via a function provision on the Internet, based on the function list when the function list is received from the image forming apparatus.

2. The management system according to claim 1, wherein the one or more processors are further operable when executing the instructions to:
if information included in the received function list indicates that the function provided by the image forming apparatus via the function provision apparatus is not available, issue a third inquiry about whether the function is available to the function provision apparatus, and
wherein the management apparatus is configured, when a reply to the third inquiry from the function provision apparatus indicates that the function is available, to transmit the function list acquisition request again to the image forming apparatus.

3. An image forming apparatus having a scan function and configured to provide a plurality of functions, the image forming apparatus comprising:
one or more memory devices storing instructions for execution by one or more processors; and
the one or more processors, operable when executing the instructions to:
if a function list acquisition request for transmitting a function list of functions provided by the image forming apparatus is received from a management apparatus configured to manage the image forming apparatus, issue a first inquiry about an operation status of a function provided by a function provision apparatus on an Internet, wherein the function provided by the function provision apparatus is a part of the functions provided by the image forming apparatus and a function for a conversion process of data read by the scan function of the image forming apparatus;

if a reply to the first inquiry is received from the function provision apparatus via the Internet, generate a function list based on both information about the functions which the function provision apparatus can provide to the image forming apparatus, and according to information about the scan function provided by the image forming apparatus without the function provision apparatus; and transmit the generated function list to the management apparatus.

4. An information processing method in a management system including an image forming apparatus having a scan function and a management apparatus configured to manage the image forming apparatus, the information processing method comprising:

transmitting, to the image forming apparatus, a function list acquisition request for acquiring a function list of functions provided by the image forming apparatus;

issuing a first inquiry, if the function list acquisition request is received from the management apparatus, to a function provision apparatus on an Internet about an operation status of a function provided by the function provision apparatus, wherein the function provided by the function provision apparatus is a part of the functions provided by the image forming apparatus and a function for a conversion process of data read by the scan function of the image forming apparatus;

generating, if a reply to the first inquiry is received from the function provision apparatus via the Internet, a function list based on both information about the function which the function provision apparatus can provide to the image forming apparatus according to the operation status included in the reply to the first inquiry and information about the scan function provided by the image forming apparatus without the function provision apparatus;

transmitting the generated function list from the image forming apparatus to the management apparatus; and controlling display of a first function corresponding to the scan function of the image forming apparatus and second functions provided by the image forming apparatus via the scan function and a function provision on the Internet based on the function list when the function list is received from the image forming apparatus.

5. An information processing method executed by an image forming apparatus having a scan function and configured to provide a plurality of functions, the information processing method comprising:

issuing a first inquiry, if a request for transmitting a function list of functions provided by the image forming apparatus is received from a management apparatus configured to manage the image forming apparatus, about an operation status of a function provided by a function provision apparatus on an Internet, wherein the function provided by the function provision apparatus is a part of the functions provided by the image forming apparatus and a function for a conversion process of data read by the scan function of the image forming apparatus;

generating, if a reply to the first inquiry is received from the function provision apparatus via the Internet, a function list based on both information about the function which the function provision apparatus can provide to the image forming apparatus according to information about the scan function provided by the image forming apparatus without the function provision apparatus; and transmitting the generated function list to the management apparatus.

6. A non-transitory computer-readable storage medium storing instructions which, when executed by a computer configured to provide a plurality of functions, cause the computer to perform operations comprising:

issuing a first inquiry, if a function list acquisition request for acquiring functions provided by the computer is received from a management apparatus, which is configured to manage the computer, to a function provision apparatus on an Internet, which is configured to provide a part of the functions provided by the computer to the computer, about an operation status of a function provided by the function provision apparatus, wherein the function provided by the function provision apparatus is a part of the functions provided by the computer and a function for a conversion process of data read by the scan function of the computer;

generating, if a reply to the first inquiry is received from the function provision apparatus via the Internet, a function list based on both information about the function which the function provision apparatus can provide to the computer according to the operation status included in the reply to the first inquiry and information the scan function provided by the computer without the function provision apparatus; and transmitting the generated function list from the computer to the management apparatus.

7. The management system according to claim 1, the one or more processors are further operable when executing the instructions to, if a reply to the first inquiry is received from the function provision apparatus via the Internet, issue a second inquiry about a use status of a function about which it is determined that detailed information can be acquired based on the reply, wherein if replies to the first inquiry and the second inquiry are received from the function provision apparatus via the Internet, the function list is generated based on both information about the function which the function provision apparatus can provide to the image forming apparatus according to the operation status included in the reply to the first inquiry and information about the function provided by the image forming apparatus without the function provision apparatus, and the reply to the second inquiry, and wherein the management apparatus is further configured to control display of a use status of the second function based on the function list.

* * * * *